3,228,844
METHOD FOR REDUCING INCIDENCE OF
DENTAL CARIES WITH VITAMIN $B_6$
Lyon Peter Strean, Plymouth Valley, Norristown, Pa., assignor to Merck & Co. Inc., Rahway, N.J., a corporation of New Jersey
No Drawing. Filed July 24, 1961, Ser. No. 125,985
1 Claim. (Cl. 167—93)

This application is a continuation-in-part of my co-pending application, Serial No. 539,001, filed October 6, 1955, now abandoned.

This invention relates to new and improved oral preparations and particularly to preparations having the effect of inhibition of dental caries in the oral cavity. The invention also involves the method or treatment of the teeth and buccal tissue to inhibit dental caries.

Within the last several decades the problem of inhibition of tooth decay has been extensively investigated by reseach workers in the field. It is recognized that there are numerous and complex variables associated with such biochemical phenomena which are of consideration in the etiology and control of dental caries. Among the myriad of factors of consideration have been the rate of acid formation and/or neutralization in the mouth; type of diet; character of enamel and saliva; presence of bacteria; oral hygiene, etc. It is generally accepted that the decalcification of tooth enamel and the like characteristic of dental caries is caused to a large extent by the acids produced from the action of certain microorganisms, which are normally present in the oral cavity or saliva, fermenting suitable carbohydrates therein.

Dentifrice and like preparations used on the teeth and gums have been a partial aid in the cleaning of the teeth and mouth. From time to time various proposals have been advanced relative to the development of "antiseptic" dentifrices and the like having allegedly the property of inhibition of tooth decay. Until recently, such claims were not substantiated by any factual evidence.

Within recent years the prior art has recognized that means for the prevention of tooth decay or at least its inhibition is a distinct possibility. The use of sodium fluoride by its addition to drinking water for a systemic effect or by topical application has received some degree of acceptance in the field. Likewise, penicillin has been used experimentally with some apparently desirable results, though this active ingredient may possess certain disadvantages such as sensitization of the patient, possibly rendering him susceptible to certain bacterial strains, etc.

Despite the extensive reseach relative to the theory of the cause, the nature and the inhibition of dental caries, it is recognized that the problem of reducing the incidence of caries by an effective dental preparation remains a challenging one to the art. While a number of agents as indicated have been proposed as possibly preventing or neutralizing acid formation either by the use of enzyme inhibitors or by direct bactericidal action on the microorganisms, the problem is much more complex due to the conventional use of dentifrice preparations by the consumer. It is necessary for proper action that any effective substance has a prolonged effect such that its introduction into the oral cavity once or twice a day will be sufficient to inhibit the degradation process during the day, if not longer. In general, the proposed substances have been uniformly unsuccessful for any prolonged effect since their activity, if any, is generally persistent for only a short period of time of the order of minutes. Thus, in addition to the need for the discovery of an effective agent, a primary difficulty is that some practicable means unique with and characteristic of such agent must be available whereby the inhibitor can be maintained at an effective concentration in the mouth at all times.

The problem is rendered even more complex by the necessity that the ingredient possess certain requisite supplementary characteristics such as satisfactory properties from the viewpoint of oral toxicity, acute chronic toxicity, nonsensitization, nonirritation to the mucous membranes, etc. and perhaps an added beneficial effect on the oral epithelium.

The formulation and manufacture of dentifrice preparations such as toothpastes and the like are highly varied in commerce. The incorporation of an effective agent of the character indicated in such a preparation is usually a specialty problem and often beset with many difficulties unique therewith, which will be apparent from the following description. A few of the vital considerations are set forth below individually. Thus, it is requisite that the ingredients be compatible with the active ingredient which must be stable and active in the formulation; proper solubility characteristics, adquate concentration of solids, controlled foaming power, stability and homogeneity of the formulation at normal and reasonably adverse conditions, nonirritability, a pleasant taste and like considerations are of prime concern also to the commercial practicality and acceptability of the product by the consumer.

An object of the invention is to provide a dental composition which has in its unitary effect the prevention or inhibition of dental caries. Another object is to provide such a composition which can be utilized in a variety of ways. Other objects and the advantages of the invention will appear hereinafter.

Broadly, the present invention relates to an oral preparation for the inhibition of dental caries having as the active ingredient a compound having vitamin $B_6$ activity. These preparations can take the form of dentifrices, mouth washes, chewing gum or the like, but since it is highly desirable to have the active ingredient present in the oral cavity at all times or for extended periods, the preparations are preferably in the form of a lozenge which can be slowly dissolved in the mouth.

By the term dentifrice is meant any of the conventional cleansing compounds such as pastes, creams, mucilaginous liquids and powders as well as dental ointment, adhesive and the like which are not necessarily considered cleansing compositions. By the term lozenge is meant a small solid mass of medicinal substance intended for administration to the membranes of the oral cavity by slowly dissolving in the mouth. Such lozenges can be in various shapes or forms such as flat, circular or rod-shaped.

Compounds having vitamin $B_6$-like activity are compounds such as pyridoxal, pyridoxine, pyridoxamine, codecarboxylase, pyridoxamine phosphate, vitamin $B_6$-borate complex, 2-methyl-3-hydroxy-4-formyl-5-hydroxymethyl pyridine and the like, and salts thereof such as the hydrochloride salt.

It is common to incorporate various adjuvant materials in oral preparations. The final dentifrice formulation may contain such materials in suitable amounts provided they are compatible with the active ingredient and the essential properties of the dentifrice preparations of the present invention. Added materials in the formulation which do not substantially adversely affect the properties and characteristics may be suitably selected and used in proper amount depending upon the particular type of preparation. Such materials can be used as soluble saccharin, flavoring oils (e.g. oils of spearmint, peppermint, wintergreen), coloring or whitening agents (e.g. titanium dioxide), preservatives (e.g. sodium benzoate, etc.), alcohol, menthol, etc., in addition to other added materials or the like which are described in the present specification.

Any suitable essentially water-insoluble abrasives or polishing agents can be employed in dentifrice preparations such as tooth powders, pastes, creams and liquids as an acid in general cleansing. Among such abrasives are calcium carbonate, dicalcium phosphate, tricalcium phosphate, aluminum hydroxide, insoluble sodium metaphosphate, bentonite, etc., including suitable mixtures thereof. In general, these materials will usually comprise the major proportion of the solid ingredients. The amount utilized is variable with respect to the abrasive effects desired and the particular type of preparation but usually will be from 5 to 95% by weight of the total composition and more particularly from about 20 to 75% in a dental cream.

In the preparation of tooth powders, it is usually sufficient to mechanically admix the various solid ingredients, the abrasives constituting the major amount, e.g. at least about 70%. In dental cream formulations, the liquids and solids must necessarily be proportioned to attain a creamy mass of desired consistency. In general, the liquids will comprise chiefly such materials as water, glycerin, sorbitol, propylene glycol, including suitable admixtures thereof. There is included within the scope of the invention both water-free and humectant-free creams. It is advantageous to use a mixture of both water and a humectant such as glycerin, sorbitol, etc., in view of good consistency attainable therein initially and upon storage, the hygroscopicity and plasticizing action of the mixture preventing appreciable hardening of the cream, and aiding in maintenance of proper solubilization effects and relationships.

For optimum effects, the active ingredients should be suitably dissolved or dispersed in the liquid phase or vehicle and the essentially water-insoluble abrasive maintained in suspension, the cream being gelled or set to maintain the mixture as stable as possible. The formation of a gel favorably affects the stability of the cream. Any suitable gelling agent or hydrophilic colloid can be employed which has the necessary swelling and setting action. The gelling agents are preferably the natural and synthetic gum and similar gum-like materials such as Irish moss, gum tragacanth, sodium alginate, gum karaya, pectin, sodium carboxymethylcellulose, starch, etc. Such materials as tragacanth glycerite of starch which are essentially mixtures of glycerin and the mucilaginous substance are included herein. These gums will usually be employed in amounts up to about 10% by weight of the dental cream, and about 0.5–5% usually.

As an embodiment of the present invention, a commercially acceptable and substantially uniform, homogeneous and stable dental cream having the essential property of inhibiting tooth decay may be prepared by suitable proportioning of the following ingredients within the specified ranges to produce a cream extrudible from a collapsible aluminum or lead tube or the like:

| | Percent |
|---|---|
| Active ingredient | 0.5–5 |
| Water-insoluble abrasive | 20.0–75 |
| Liquid vehicle | 20.0–75 |
| Gelling agent | 0.0–15 |

Minor amounts of flavor, sweetener such as soluble saccharin, etc., will also be added usually. The liquid vehicle is preferably water, or a liquid humectant or excipient such as gylcerin, sorbitol, etc. and suitable mixtures thereof, the total liquid content being usually in an amount from about 30–65% by weight of the total ingredients. Preferred creams of the present invention which yield optimum results have the proportions below, the amounts in parentheses being highly desirable in commercial practice.

| | Percent |
|---|---|
| Active ingredient | 0.5–4 (1–3) |
| Water-insoluble abrasive, preferably containing insoluble phosphate | 30.0–65 (40–60) |
| Glycerine (or the like) | 5.0–50 (10–40) |
| Water | 5.0–50 (10–40) |
| Gelling agent | 0.1–4 (0.5–1.5) |

The pH of the dental cream is variable and may be slightly alkaline or acid as desired since the saliva is a buffered medium. The pH of a 20% aqueous slurry of the cream will be usually about 5 to about 10. It is preferred that it be substantially neutral, e.g. about 6–8, for optimum effects.

As previously indicated, mouth washes or rinses are also within the scope of the present invention. Such products are usually an effective amount of the active ingredient dissolved in a suitably flavored liquid vehicle, preferably aqueous alcoholic vehicle. While amounts of up to five percent active ingredient can be used, it is desirable to use about 0.05 to about 2%, and preferably up to about 1% by weight. The alcohol concentration may vary depending on the mouth effect desired, such as about 5–70% alcohol, and preferably 5–40%. Liquid dentifrices are also included, such products usually containing larger amounts of active ingredients, e.g. 0.5–5%, dissolved in an aqueous mucilaginous vehicle, optionally combined with small amounts of abrasive, alcohol, glycerine, coloring and flavoring materials.

The lozenges or troches are prepared by mixing fine particles of the active material with saccharin and mucilage. They can also have a base of gelatin and water and be flvored with non-sugar flavoring agents. The active ingredient can be used up to 5% but a range of 0.5 to about 2% is preferable. In a similar manner, a chewing gum can be prepared by the addition of a gum base for the mucliage such as chicle or other natural gum or combinations as, for example, jelutong gum, catiau gum, hangkang gum, lechicasti gum, pendari gum or ester gum. Suitable filling and flavoring ingredients can be added.

The addition of other antimetabolites in various concentrations to the composition are also useful. As an example, pantoyltaurine which interferes with the growth and acid formation of *L. acidolphilus* and bis betapantolyaminoethyl disulfide which interferes with pantothenic acid metabolism. The useful concentrations would vary from 1 to 50 mg. per unit dose depending on the various factors. The addition of about 0.5% of papain to chewing gum will help digest protein matter around teeth.

In accordance with the present invention, the above enumerated compositions are administered in a manner such that an amount of the vitamin $B_6$ active compound having at least 3 mg. and preferably from about 3 to about 10 mg. of vitamin $B_6$ activity is applied, per treatment, to the teeth and oral tissue for an extended period of time, preferably for at least 5 minutes. The particular amount of the vitamin $B_6$ active compound applied per treatment will, for the most part, be dependent upon its vitamin $B_6$ activity and the mode of administration, namely, whether it is to be administered as a component of a dental cream, ointment, liquid dentifrice, mouthwash, lozenge, troche, chewing gum and the like. Where the vitamin $B_6$ active compound is to be applied as a component of a dental cream, mouthwash or liquid dentifrice, it is preferred that such compositions be administered in a manner such that from about 6 mg. to about 10 mg. of vitamin $B_6$ activity is applied to the teeth and oral tissue for an extended period of time. Where the vitamin $B_6$ active compound is to be applied as a component of a lozenge, troche or chewing gum, the preferred range is from about 3 mg. to about 6 mg.

In a preferred mode of administration, the vitamin $B_6$ active compound is incorporated in a lozenge or troche and the lozenge or troche placed in the mouth and retained there until dissolved by the saliva. During the dissolution process there is exposed around the teeth and oral tissue a constant supply of vitamin $B_6$ activity for an extended period of time.

In another preferred mode of administration, the vitamin B active compound is incorporated in a chewing gum which, upon continuous mastication, releases a constant supply of vitamin $B_6$ activity around the teeth and oral tissue for an extended period of time.

However, regardless of the manner in which the vitamin $B_6$ active compound is applied, it is essential in order to achieve the desired results that the amount of vitamin $B_6$ active compound introduced into the mouth, per treatment, be sufficient to provide therein at least 3 mg. of vitamin $B_6$ activity. The number of treatments per day may vary but in general two treatments per day are sufficient and three are preferred for optimum results.

The following examples are given for the purpose of illustration:

Example 1

A quantity of lozenges were prepared each having the following composition:

|   | Gram |
|---|---|
| Pyridoxine hydrochloride | 0.0060 |
| Sodium citrate | 0.0125 |
| Saccharin | 0.0025 |
| Magnesium stearate | 0.0050 |
| Methocel | 0.0125 |
| Cherry selva | 0.0082 |
| Polyethylene glycol 4000 | 0.2222 |
| Calcium lactate | 0.2222 |
| Acacia | 0.0555 |
|   | 0.5466 |

The polyethylene glycol is melted and mixed with distilled water. Acacia was mixed with enough 95% ethanol to form a damp mass. The acacia was then added to the polyethylene glycol water mixture while agitating. The calcium lactate is then added and the mixture blended until smooth, after which the mixture is cooled and granulated. The granules are dried at 35° C. for 48 hours and then regranulated. The pyridoxine hydrochloride, sodium citrate, saccharin, magnesium stearate, cherry selva and methocel were blended together. This blend was then mixed with the dried granules and the composition blended for two hours. The composition was then formed into lozenges.

Example 2

A dental ointment of vitamin $B_6$ containing the following ingredients was prepared as described below:

|   | Gram |
|---|---|
| Vitamin $B_6$ | 0.050 |
| White wax | 0.049 |
| White petrolatum | 0.901 |
|   | 1.000 |

The white wax and white petrolatum were weighed into a container. The container was placed on a steam bath and all contents melted. The vitamin $B_6$ was added and the ointment allowed to cool with stirring until it had congealed. The cool ointment was passed through a roller mill and samples were removed from the roller mill at intervals to assure uniform distribution of vitamin $B_6$. The product was then packaged.

A small quantity of ointment was placed between glass slides and viewed through a strong light contained no crystal aggregates visible to the eye.

Example 3

A dental ointment of pyridoxal hydrochloride containing the following ingredients was prepared as follows:

|   | Gram |
|---|---|
| Pyridoxal hydrochloride | 0.005 |
| White wax | 0.054 |
| White petrolatum | 0.941 |
|   | 1.000 |

This formulation was prepared in the same manner as that described in Example 2.

Example 4

A flavored dental ointment of pyridoxamine dihydrochloride containing the following ingredients was prepared as described below:

|   | Gram |
|---|---|
| Pyridoxamine dihydrochloride | 0.025 |
| White wax | 0.049 |
| White petrolatum | 0.918 |
| Oil of peppermint | 0.008 |
|   | 1.000 |

The white wax and white petrolatum were melted and stirred until the temperature reached 50° C. The pyridoxamine dihydrochloride and oil of peppermint were then added and the ointment allowed to cool with stirring until it had congealed. The congealed mixture was then milled to form a uniform ointment.

Example 5

A dental paste of codecarboxyalase containing the following ingredients was prepared as described below:

|   | Percent |
|---|---|
| Codecarboxyalase | 1.00 |
| Carboxymethylcellulose | 0.86 |
| Glycerine propylene glycol | 10.00 |
| Water | 20.00 |
| Methyl para-hydroxy-benzoate | 13.20 |
| Saccharin solution (50%) | 0.10 |
| Oil of spearmint | 0.20 |
| Non-ionic surface active agent | 2.50 |
| Mineral oil | 0.90 |
| Dicalcium phosphate | 51.00 |

The glycerine and propylene glycol were mixed together, and about one-fifth of this solution was added to the carboxymethylcellulose and mixed to form a slurry. The methyl para-hydroxy-benzoate was dissolved in the water with the aid of heat and then added to the slurry and mixed well to form a gel. The remainder of the glycerine-propylene glycol solution was thoroughly incorporated into the gel. The saccharin solution, oil of spearmint, mineral oil and the non-ionic surface active agent were added to the gel and thoroughly mixed. The powdered dicalcium phosphate and codecarboxyalase were mixed and incorporated into the gel in small amounts until it had all been added. The above mixture was then milled to form a smooth, white dentifrice.

Example 6

A chewing gum can be prepared having the following composition:

|   | Grams |
|---|---|
| Vitamin $B_6$ | 1.00 |
| Chicle | 30.30 |
| Corn syrup | 24.20 |
| Saccharin | 45.30 |

The chicle is heated until it is of syrupy consistence and washed with 3–4% aqueous hydrochloric acid, dilute aqueous sodium bicarbonate solution and water in turn. The corn syrup is then added to the gum base and a mixture of saccharin and vitamin $B_6$ incorporated and the entire mass mixed well, allowed to cool and formed into 1 gm. units of desired shape.

Example 7

A coated chewing gum can be prepared having the following amounts of vitamin $B_6$ and papain per gm. unit of chewing gum:

|   | Mg. |
|---|---|
| Vitamin $B_6$ | 3.0 |
| Papain | 8.0 |

Gum centers are prepared as described in the preceding example with the exception that no vitamin $B_6$ is added prior to the formation of the 1 gm. units. The gum centers are coated with pharmaceutical glaze to retain moisture. A sugar subcoat is then applied followed by the vitamin $B_6$ and papain mixed in a dusting powder comprising magnesium carbonate to a concentration of 3.0 mg. of vitamin $B_6$ and 8 mg. of papain per gum unit. The gum units are then coated with sugar coating and polished.

*Example 8*

A tooth powder of papain and pyridoxine hydrochloride was prepared by thoroughly mixing the following ingredients in the proportions described below:

| | Gram |
|---|---|
| Calcium phosphate, dibasic | 0.6530 |
| Titanium dioxide | 0.1000 |
| Sodium citrate | 0.1000 |
| Citric acid | 0.0200 |
| Saccharin | 0.0005 |
| Sodium saccharin | 0.0005 |
| Spearmint flavor | 0.0400 |
| Menthol flavor | 0.0120 |
| Pyridoxine HCl | 0.0010 |
| Papain | 0.0050 |
| Pluronic F-68 | 0.0200 |
| Saponin | 0.0010 |
| Vanillin | 0.0010 |
| Cinnamon flavor | 0.0130 |
| Birch flavor | 0.0130 |
| Wintergreen flavor | 0.0200 |
| | 1.0000 |

*Example 9*

A quantity of lozenges were prepared each having the following composition:

| | Gram |
|---|---|
| Pyridoxine hydrochloride | 0.0032 |
| Powdered sucrose with 3% starch | 0.9000 |
| Sodium chloride | 0.0070 |
| Gluocose | 0.1150 |
| Oil of peppermint | 0.0006 |
| Anethole | 0.0012 |
| Magnesium stearate | 0.0070 |
| | 1.0340 |

The pyridoxine hydrochloride was triturated with the sodium chloride and about 10% of the powdered sucrose. The resulting mixture was then added to the balance of the sucrose. The glucose was then dissolved in a small amount of distilled water and added to the mixture. The mixture was then granulated, passed through a No. 10 screen and dried at 120° F. for 16 hours. The dried granules were then ground to No. 40 mesh. The oil of peppermint and anethole were then dissolved in 95% ethanol and this was added to a small portion of the dried granulation. This was then blended with the balance of the granulation and the magnesium stearate added and the granules formed into lozenges.

Any departure from the above description which conforms to the present invention is intended to be included within the scope of the claim.

I claim:

A method for reducing the incidence of dental caries which comprises applying to the oral tissue and teeth an amount, per application, of a vitamin $B_6$ active compound having an activity equivalent to at least 3 milligrams of vitamin $B_6$ and maintaining said vitamin $B_6$ active compound in contact with said tissue and teeth for an extended period of time.

References Cited by the Examiner

UNITED STATES PATENTS

| 2,027,374 | 1/1936 | Fowler | 167—93 |
| 2,406,741 | 9/1946 | Compton et al. | 167—81 |
| 2,600,700 | 6/1952 | Smith | 167—55 |

OTHER REFERENCES

Bergey's Manual of Determinative Bacteriology, sixth edition, published by Williams and Wilkins Co., Baltimore, 1948, pp. 305 and 350 relied upon.

Physicians Desk Reference, seventh edition, 1953, p. 517 relied upon.

Werkman et al.: Bacterial Physiology, published by Academic Press Inc., New York, 1951, pp. 241-243 relied upon.

LEWIS GOTTS, *Primary Examiner.*

M. O. WOLK, *Examiner.*